INVENTOR
GIOVANNI BADALINI

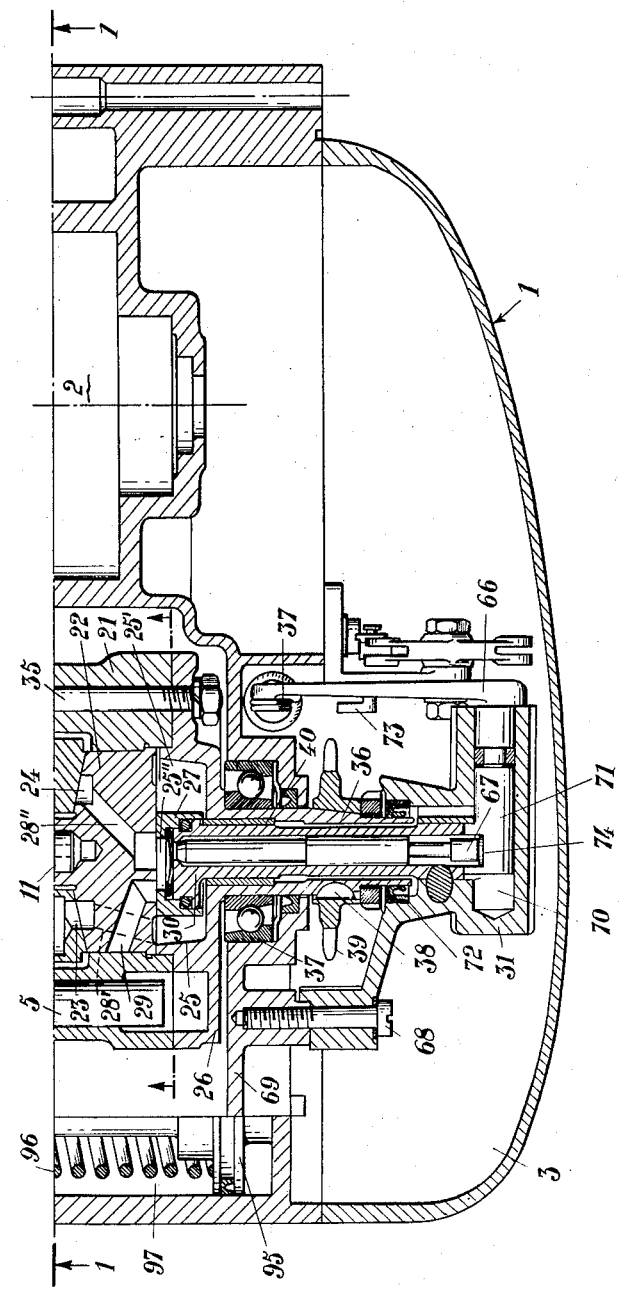

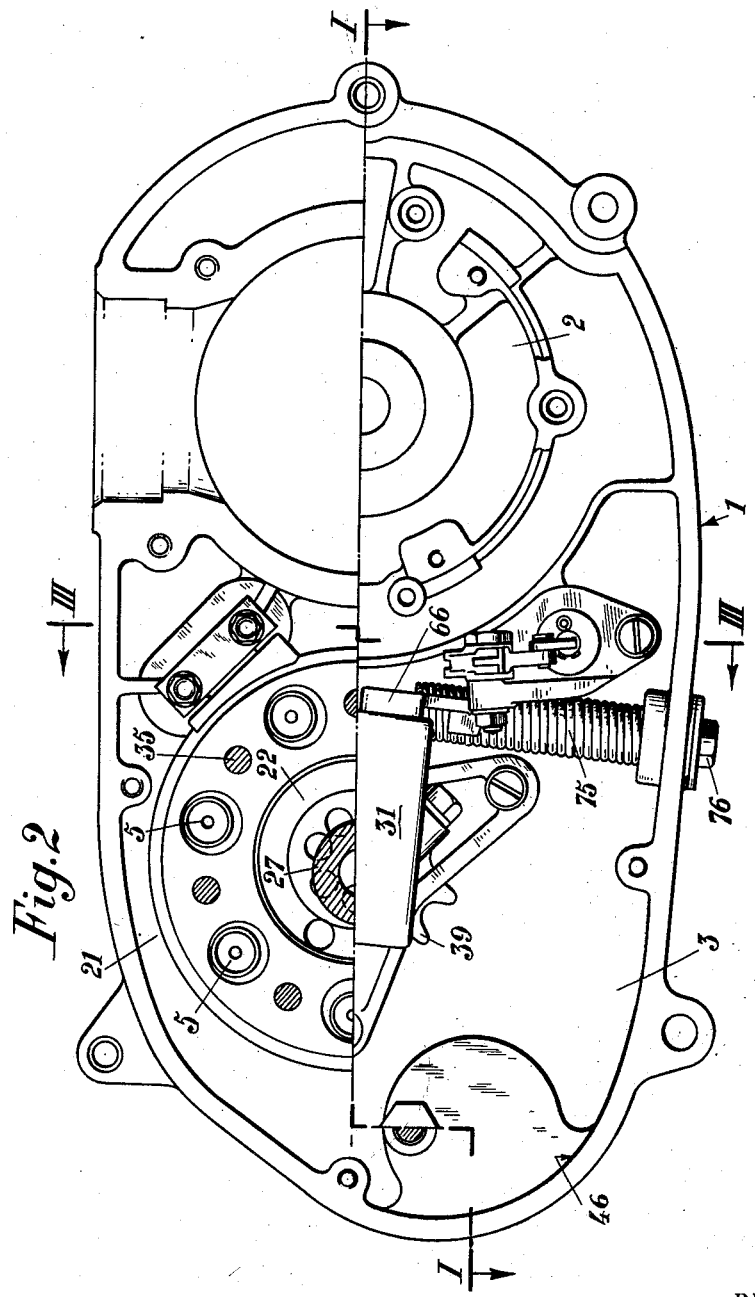

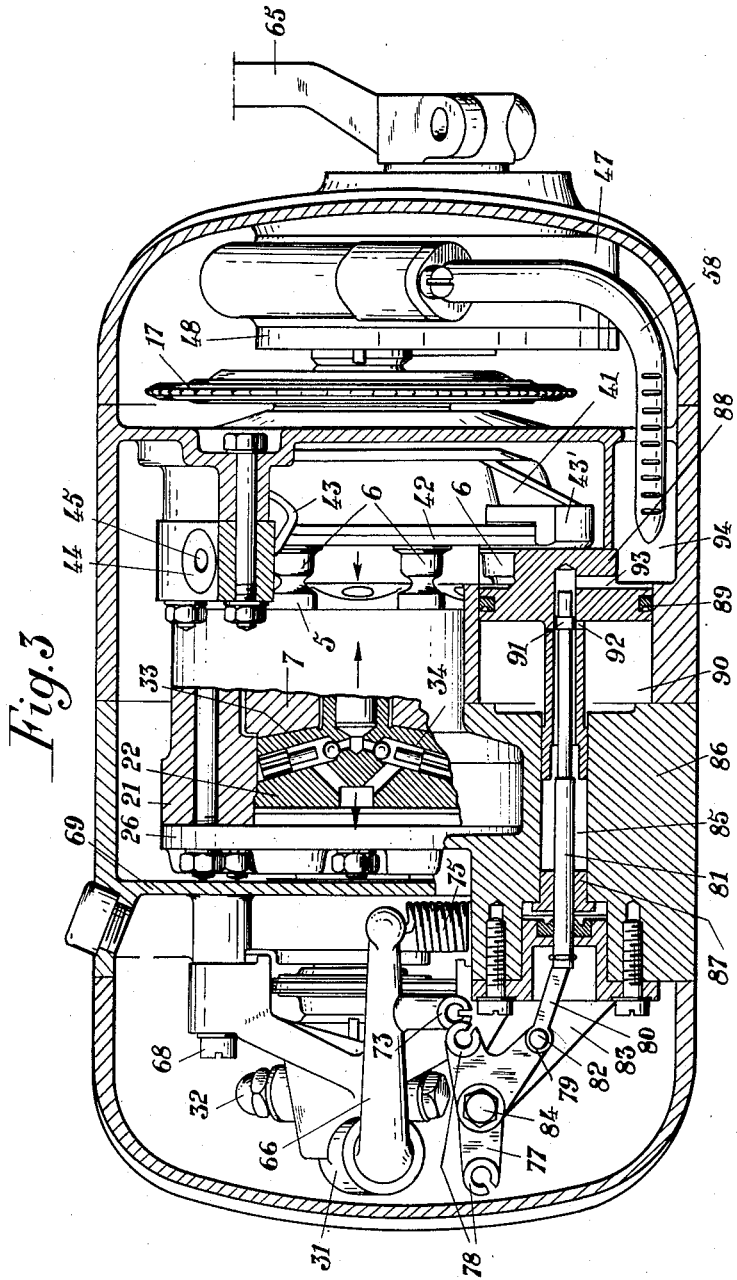

United States Patent Office 2,817,953
Patented Dec. 31, 1957

2,817,953

ROTARY PUMP AND MOTOR HYDRAULIC POWER TRANSMISSION

Giovanni Badalini, Rome, Italy, assignor to Cambi Idraulici Badalini S. p. A., Rome, Italy, an Italian company Application July 12, 1954, Serial No. 442,656

Claims priority, application Italy April 14, 1954

5 Claims. (Cl. 60—53)

The present invention relates to a continuous variable speed hydraulic power transmission apparatus, particularly for motorcycles.

The power transmission systems for the wheels of the motorcycles are known, which systems commonly comprise an internal combustion engine, a power transmission member from the engine to the system for varying the speed ratios, a member for disconnecting the clutch coupling between said engine and said change speed system, a driving member between said change speed system and the propellant wheel. The purpose of the aforesaid system is that of allowing the engine, by the insertion of suitable speed ratios, to operate at the optimum number of revolutions for its complete efficiency, and in the meantime of adequating the number of revolutions of the wheels to the resistance presented by the road; in other words, the purpose is that of causing the driving transmitted torque of the I. C. engine to be always balanced by the resistant torque given by the wheels. Said balance between the resistant torque and the driving torque occurs through a succession of operations which must be carried out by the driver who operates subsequently: the disconnection of the clutch between the engine and the change speed device, the instrumentality for changing the speed ratio, and again the aforesaid clutch for inserting the selected speed ratio. Contemporaneously and opportunely, the driver must time the movements for accelerating or decelerating the engine. Said operations are more complex in case the need of a new balance between the resistant torque and the driving torque is due to an increase of the resistant torque, as in this case it is necessary to time in a more complex way, by either manual or automatic means, the number of revolutions of the rotary members both of the change speed device and of the engine.

Furthermore, it is to be noted that the balance between the driving torque and the resistant torque is never a perfect one, i. e. exactly meeting the exigencies, as the speed ratios at disposal of the driver are very reduced in their number (commonly 3–4) and are generally function of the use of the vehicle, of the commonly travelled roads and so on. This fact causes, commonly, either an excess of the driving torque of the engine, causing the racing of the latter, or a lack of said driving torque of the engine, and said lack causes the engine to slow down; in any case stresses occur which are prejudicial for the moving members.

The purpose of the present invention is that of providing a transmission apparatus, allowing by a sole and simple manual control (besides the accelerator control for the engine) the driving torque and the resistant torque to be rendered continuously and perfectly balanced; another control serves for uncoupling the clutch between the engine and the wheels, or, better, between the transmission apparatus and the wheels, i. e. for having the engine idling. The uncoupling control, as the change speed device is of a continuous nature, is used only for having the engine idling and not for the speed change.

This purpose is embodied by a unit comprising both the I. C. engine and the transmission apparatus, said transmission apparatus comprising a displacement pump and a displacement hydraulic engine, connected in closed circuit between themselves; the pump is concentrically arranged inside the hydraulic engine, being controlled by the I. C. engine, while the hydraulic engine operates the rear wheel of the vehicle by means of a chain-and-sprocket drive. The variations of the liquid flow between the pump and the hydraulic engine, produced by the variations of the volume of the cylinders of the hydraulic engine, controlled by the driver, cause a variation of the ratio of the revolutions number between the driving members and the driven members, and therefore the balance between the driving torque and the resistant torque of the aforecited driving and driven members. The variation of the cylinders volume is effected by a control operated by the driver and acting on the device adjusting the pistons stroke of the hydraulic engine, in a continuous way and through a uniform variation.

One preferred form of embodiment of this invention is shown in the attached drawings wherein:

Figs. 1 and 1', arranged in prosecution, show a horizontal longitudinal section through the apparatus, taken on the line I—I of Fig. 2;

Fig. 2 is a vertical longitudinal section through the apparatus;

Fig. 3 is a vertical cross-section through the apparatus, taken on the line III—III of Fig. 2;

Figure 1:
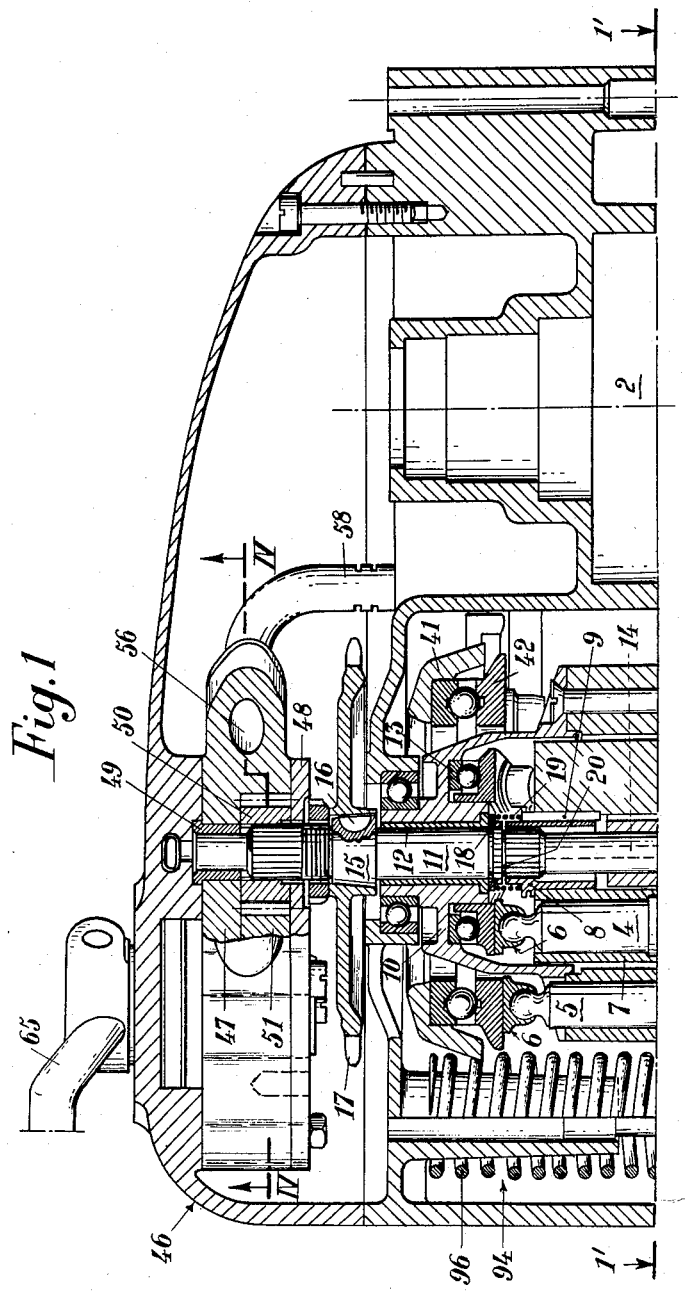
Figure 4:
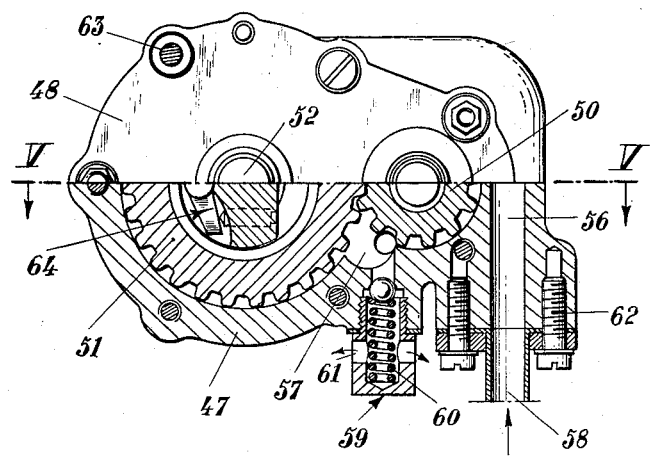
Fig. 4 is a detail longitudinal section of the pressurising pump, taken on the line IV—IV of Fig. 1.
Figure 5:
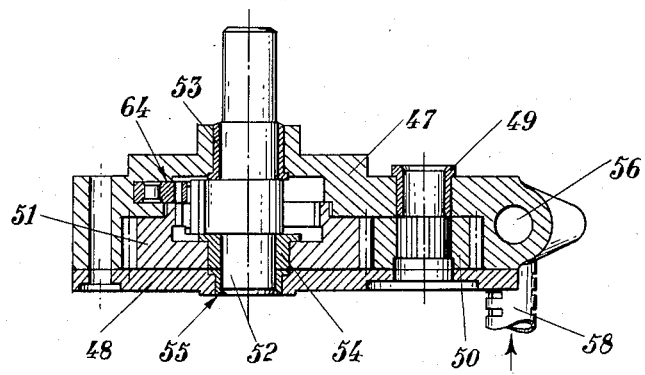
Fig. 5 is a cross-section of the pressurising pump, taken on the line V—V of Fig. 4.

With reference to the drawings 1–5, the engine case 1 is shaped for containing both the crank shaft of the I. C. engine housed at 2, and the transmission apparatus arranged in adjacent position at 3, the crank shaft being arranged in front in respect to the motion direction of the vehicle.

The input shaft of the transmission apparatus is crosswise arranged in respect to the motion direction of the vehicle; said shaft controls the displacement pump and is supported at one side, by an inner web of the case 1, while it is freely journalled within a member solidal in turn with the output shaft supported at the same point, with the insertion of a bearing, at the other side by the distributor of the displacement pump; the output shaft, coaxial with the input shaft, is supported, besides at the aforesaid point, by an inner sector of the case 1, at the side of said case opposite to the previously cited one, by the insertion of a bearing.

The transmission apparatus which will be further detailed hereinafter, has been subdivided in its essential features, in groups of elements, to which reference will be made in the course of this specification; said groups comprise:

Group 1—The pistons for the pump and for the hydraulic engine.
Group 2—The body of the cylinders of the pump.
Group 3—The closing cap for the pump.
Group 4—The body of the cylinders of the hydraulic engine.
Group 5—The closing cap for the hydraulic engine.
Group 6—Rocking plate for the hydraulic engine.
Group 7—Pressurising pump.
Group 8—Support for the idling control.
Group 9—Levers for the transmission controls.

*Group 1.—The pistons for the pump and for the hydraulic engine*

The pistons shown in the figures at 4 for the pump pistons and at 5 for the engine pistons, respectively, are seven both for the engine and for the pump. Each piston 4 or 5 is formed by an internally hollow cylindrical body, made of steel and provided with a spherical head to which is associated the element or slipper 6, the cross-section of this latter being circular and provided with a spherical recess corresponding to the head of the piston to which it is associated while the surface of the slipper, opposite to said spherical recess, is flat and apt to rest on the lower surface of the pistons operating plate. One slipper 6 corresponds to each piston, 4 or 5, respectively.

*Group 2.—The body of the cylinders of the pump*

The aforecited pistons 4 glide during their operation within corresponding cylindrical bores lengthwise provided within a cylindrical body 7 made of pig iron, said bores being arranged along one circumference of said body 7. The cylindrical body 7 is flat at one of its ends and is provided at the other end with a concave surface; the cylindrical bores wherein glide the pistons 4 do not pass lengthwise throughout the body 7; said bores end at a short distance from the concave surface of said body, but the perforation is completed in order to create a passage for the compressed fluid entering the pump, by means of holes having a lesser diameter, eccentrically arranged in respect to the axis of the pistons. In the central position of the cylindrical body 7 is provided a lengthwise arranged hole, passing throughout the body, suitable to insertion, from the opposite side in respect to the concave surface, of an internally splined bush 8, fixed to the cylindrical body 7 by means of three pins 9 made of drawn steel; the bush 8 is applied to the cylindrical body 7, in order to allow the transmission of the rotary motion to said cylindrical body 7.

*Group 3.—The closing cap for the pump*

At the side remote from the concave surface of the cylindrical body 7 is arranged a bell-shaped closing cap 10 which is centrally passed through by a driving shaft 11 which is freely journalled within the hole passing through said cap. A bronze inner bush 12 is assembled in said hole. The cap 10 presents a recess defining the bell, the inner bottom whereof is provided with a plane inclined in respect to the plane defined by the edge of the bell; this edge is provided on its plane with peripheral projections wherein are pierced the holes for fixing said cap to the cylinders body of the hydraulic engine. The bush 12 is provided, internally, with lubricating ducts. The inner bottom of the cap 10 is shaped for containing a ball bearing 13 which is apt to giving, by its flat and free surface, the resting for the slippers 6 of the pistons 4, when the cylindrical body 7 revolutes in respect to the cap 10. The steel driving shaft 11, passing, as aforesaid through a longitudinal hole of the cap 10, within the bush 12 is provided near to one of its ends, with a trapezoidal splining for controlling a pressurising pump; a second splined zone, inside the bell of the cap 10 serves for coupling with the internally splined bush 8, for transmitting the rotary motion to the cylinders body 7. The shaft 11 is lengthwise passed through by a hole 14; a projecting portion 15 of the shaft prevents this latter from lengthwise gliding in one direction in respect to the cap 10, and on said projecting portion, the shape whereof is frusto-conical, is provided the housing 16 for a steady connection with the gear 17 which is operated by means of a chain, by the crankshaft of the I. C. engine arranged at 2. A steel ring 18, which is internally splined for insertion on the shaft 11, in correspondence with the splined zone for the coupling with the cylindrical body 7, rests against the lower end of the bush 12 forming the resting member for the thrust spring 19 for the cylinders body 7 against the distributor 22. A stop member 20, ring shaped, in a corresponding peripheral groove of the shaft 11 holds the ring 18 on the shaft 11.

*Group 4.—The body of the cylinders of the hydraulic engine*

The cylinders of the hydraulic engine, wherein the pistons 5 glide, are provided in a body 21 the shape whereof is substantially cylindrical; the cylinders are embodied by means of bores, the diameter whereof corresponds to that of the pistons 5, said bores being arranged along an inner circumference of the body 21, the area of said bores being increased in correspondence with the input or output for the fluid into the cylinders. The body 21 is centrally hollow in its inner portion, i. e. it is provided with a throughout hole so that the cylinders are enclosed within a circular ring; the central hole is suitably shaped so as to allow the rest and fixing of the distributor 22 of the pump 7 which, as aforesaid, is concentrical with the hydraulic engine 21, as the body of the cylinders 7 of the pump is inserted within the body 21 of the hydraulic engine.

The distributor 22, the shape whereof is substantially cylindrical, is centrally provided with a hollow projecting part for housing the end of the shaft 11. At the side of said projecting part, on an intermediate circumference, between said projecting part and the periphery of the distributor, are provided two openings having the shape of a portion of circular ring, forming the delivery port 23 and the sucking port 24 of the pump, said ports being connected to the chamber 25 provided between the distributor 22 of the pump and of the cap 26. The chamber 25 is divided into two parts by the annular eccentrical distributor 27, namely an outer chamber 25' and an inner chamber 25". The ports 23 and 24 are connected with the chambers 25' and 25", respectively, by means of the ducts 28' and 28". In the same distributing plate 22 are provided the holes 29 connecting the chamber 25 with the bore of the cylinders of the hydraulic engine.

The annular distributor 27 is stationary and carries out the distribution of the fluid to the hydraulic engine. The axis of said distributor is parallel and laterally displaced in respect to the axis of the shaft 11. The eccentric displacement of the ring is in the same plane comprising the axes of the pivots of the plate 41. The ring 27 is eccentrically carried by a spindle, with an eccentric 30; said eccentric is housed into the recess of the ring 27. The spindle 30 is mounted on the support 31 of the idling control, whereby it is held stationary by a nut 32. The upper surface of the distributor 22, which is in contact with the surface of the cylindrical body 7 of the pump, said cylindrical body being pressed against the aforesaid surface by the action of the spring 19, has a spherical shape so as to embody a perfect connection in order to ensure the rest stability for the cylindrical body 7 on the distributor 22. The supplemental fluid is supplied by a pressurising pump which will be described with the group 7, at a pressure which is always greater than the atmospherical pressure, but which is less than the delivery pressure of the pump 7; said fluid reaches the distributor 22 through the hole 14 of the shaft 11. Said fluid reaches the ball valves 33 and 34 arranged within the body of the distributor, said valves being controlled by the pressure difference of the fluid and allowing the fluid to be admitted into the circuit portion where the pressure is less than in the other portions, in order to ensure a continuous rest of the slippers 6 against the associated resting surfaces, whatever be the operative conditions and in order to avoid the formation of air bubbles in those portions of the circuit which are at a lower pressure. Parallel to the cylinders bores and on the same circumference of the cylindrical body 21 are provided the holes for insertion of the crab bolts 35 with countersunk heads for connecting the cap 10, the body 21 of the cylinders and the closing cap 26 which is hereinafter described.

Group 5.—The closing cap for the engine

Adjacent to the body 21 of the cylinders is mounted a steel cap 26 for closing said body 21 of the cylinders, the shape of said cap being cylindrical shallow; said cap is centrally provided, at its lower side, with an elongated sleeve 36, internally hollow; also, the cap is provided at its outer periphery with the holes for the passage of the throughout bolts 35 connecting the cap 10, the cylindrical body 21 and the aforesaid cap 26. The sleeve 36 forms the out-put shaft of the unit and is provided with a housing for the bearing 37 mounted thereon, with a recess 38 for the connection with the out-put gear 39 and with a bush 40, mounted inside said sleeve 36 for the movement in respect to the spindle 30 provided with the eccentric. Said eccentric, as aforesaid, is housed within the recess of the distributor ring 27.

Group 6.—Rocking plate for the hydraulic engine

A rocking plate 41 is mounted adjacent to the cylindrical body 21 of the engine, said plate, having a substantially flat circular shape, having the task of holding the particular ball bearing 42 provided with a flat surface whereon rest, when relatively rotating, the slippers 6 associated with the pistons 5 of the hydraulic engine.

The rocking plate 41 is laterally provided with two projections 43 provided with opposite, but not diametrically opposite, pivots arranged so that the rotation axis determined thereby does not pass through the center of the plate; furthermore said pivots are internally bored in order to receive the adjusting pins 45 for the bearing of the engine. The pivots 44 carried by the projections 43 of the rocking plate, as they are laterally inserted into housings provided in the outer case 1 of the transmission, allows the plate to rock in respect to the case, and these oscillations determine the variations of the cylinders volume of the engine, when the cylindrical body 21 revolutes in respect to the plate 41. A projecting member 43' serves for the rest of the piston 88.

Group 7.—Pressurising pump

At the end of the shaft 11 and beyond the input toothed wheel 17 is arranged the group of the pressurising pump, within a portion 46 of the case 1 defined by longitudinal webs arranged into said case. The purpose of this pump is that of furnishing a fluid under a pressure higher than the atmospheric pressure, to be sent in those cylinders which are not submitted to compression, or which, anyhow, are under a lesser pressure than the circuit, and in the other portions of the circuit submitted to a lower pressure in order to allow the back stroke of the pistons, in order to avoid the air bubbles to be formed into the circuit. The pressurising pump is controlled by the shaft 11, the end whereof is splined, as aforesaid.

The pump is contained into a case 47 provided with a closing plate 48; a bush 49 inserted within the case 47 allows the end of the shaft 11 to rotate. A toothed pinion 50, inside the recess contained between the case 47 and the plate 48, is mounted on the shaft 11, whereon it is engaged by means of its splined inner surface inserted on the splined portion of that shaft; said pinion 50 engages with a gear 51 revoluting about a shaft parallel to the shaft 11. Said shaft 52 idles into the gear 51. The gears 50 and 51 form the displacement pressurising pump. The shaft 52 is journalled into the sleeves 53, 54 and 55 housed in the case 47, in the gear 51 and in the closing plate 48, respectively.

The inner side of the case 47 is provided with a duct 56 which is in connection with the recess 57 wherein the toothed pinion 50 rotates; said duct is also connected with the sucking pipe 58 of the pump. In another recess is arranged, so as to project outside of the case, a vent valve 59 provided with a ball and a gauged spring 60, with outer ducts 61 for venting the excess of pressure of the circuit; the sucking pipe 58 is connected to the case and fixed thereon by means of the screws 62.

The closing plate 48 is connected to the case 47 by the screws 63.

The gear 51 idles on the shaft 52 with the insertion of the bush 54 inside the gear 51, and the shaft 52, through a device 64 known per se, controls the movement in a sole direction of said gear; the shaft 52 can be operated by the starting pedal 65 of the I. C. engine, and the operation of the gear 51, and consequently of the pinion 50 causes also the operation of the pressurising pump, i. e. said operation causes the starting pressure in the fluid circuit. The operation of the starting pedal causes, through the gear 17, the I. C. engine to be started, as said gear 17 is connected to the crank-shaft. When the engine has been started, the free-wheel device 64 allows the independent rotation of the gear 51 (controlled by the pinion 50) in respect to the shaft 52, i. e. said shaft 52 is not driven by the rotation of the I. C. engine. The gear 51 has a diameter greater than the one of the pinion 50 in order to multiply the motion transmitted by the pedal, for correctly starting the I. C. engine. The sucking pipe 58 is bent so as to pick up the oil into the portion 46 of the case, and said pipe is closed at its taking end, but it is provided with crosswise slits for allowing the passage of the sucked oil.

In case the lubrication of the I. C. engine which operates the vehicle is independent, the oil for the operation of the transmission device can be the same oil which travels in the lubrication device of the internal combustion engine, and the pressurising pump can be used for sending the oil into the lubrication circuit of the I. C. engine.

Group 8.—Support for the idling control

A lever 66 for the idling control, operates the short-circuiting valve 67, which serves for connecting that portion of the circuit which is under pressure, with that portion where the pressure is less, so as to have the driving portion idling in respect to the driven portion.

The lever 66 is supported by a substantially triangular support 31, fixed by the screws 68 to an intermediate web 69 in the outer case 1. Inside the support 31, the spindle 71 of the lever 66 is journaled into a bush 70, and a sealing ring 72 prevents the oil from outflowing through the bore where the spindle 71 of the lever 66 is inserted. A member 73 serves for connecting said lever 66 with the associated control string. The spindle 71 is provided with a recessed eccentric 74 wherein glides the end plug of the valve 67, which is held pressed in its seat by the higher portion of the eccentric 74; when the lever 66 is operated, i. e. when the spindle 71 of said lever 66 is revoluted, the end plug of the valve 67 reaches the lowered portion of the eccentric 74 and the valve can open. The spindle 71 is held to the closing position for the valve 67 by a spring 75 fixed to the outer case 1 by a member 76.

Group 9.—Levers for the control of the ratio

The oscillation of the plate 41 supporting the bearing 42 for the rest of the slippers 6 of the pistons 5 is controlled by the operation of a control lever 77. The movement of the oscillating plate 41 determines the variation of the stroke of the pistons 5, and therefore a variation of the stroke volume of the engine. The lever 77 has a substantially triangular shape and is prvided with three arms, two whereof are provided with open rings 78 for the connection with the control string, while the third arm is provided with a hole 79 for its connection with the control link 80 of the distributor 81; said connection which is embodied by a pivot 82 operates the movement of the plate 41. The lever 77 is pivoted at its center on a bracket 83 of the case 1, fixed by means of a screw 84. The distributor 81, guided by a sleeve 87 moves within a bore 85 parallel to the cylinders of the engine and provided into a projecting portion 86 of the outer case 1. A plunger 88, provided with a packing ring 89 tightly glides into a bore 90 provided in the body of the case 1, and is operated by the liquid which is caused to flow by the movement of the distributor 81; said bore 90 and said plunger 88 form a fluid operated servomotor for controlling the plate 41, acting on the projecting part 43' of said plate.

Operation

The I. C. engine, the crank shaft whereof is contained in the recess 2 adjacent to the transmission apparatus, which is contained in the recess 3, drives by means of a chain (not shown in figure) the toothed wheel 17. This latter, by means of the shaft 11 whereon it is keyed, revolutes the cylindrical body 7 of the pump. Both the cylindrical body 7 and the pistons 4 are caused to rotate; the pistons are reciprocated by the inclined surface 13 whereon they rest. The induction stroke of the pistons, i. e. the continuous rest of the slippers 6 on the surface of the bearing 13, is due to a pressure, greater than the atmospheric pressure, produced by the pressurising pump within that portion of circuit being at a lower pressure. The spherical surface distributor 22 whereon the body 7 of the cylinders rests, sends the fluid to the bores wherein glide the pistons 5 of the cylindrical body of the engine 21; said pistons 5 are caused to move into the respective cylinders, and resting through the slippers 6 against the surface 42 which is assumed, by way of example, to be slant and stationary, the outwards movement of the pistons 5 acts on the surface 42 which causes the cylindrical body 21 of the engine to rotate. The body 21 of the cylinders is rigid with the closing cap 26 which in turn is rigid with the output gear 39. Thus, said gear 39 is caused to rotate transmitting, by means of a chain, its motion to the rear wheel of the vehicle. The slant of the surface 42 is the element which determines the stroke of the pistons 5 of the hydraulic engine 21, and the greater or minor stroke of the pistons 5 causes in turn, due to the greater or lesser amount of concerned fluid, a higher or lower revolution speed of the body of the cylinders of the engine 21.

Therefore, the slant of the surface 42 determines the variations of the relative speeds of the cylindrical body of the pump (i. e. driving shaft 11) and of the cylindrical body of the engine (i. e. output gear 39).

The variation of the slant of the surface 42 is controlled by means of the plunger 88 (Fig. 3); the plate 42 tends always to its maximum slant; as aforesaid, this plate 42 is pivoted along a non diametrical axis and therefore the thrust of the pistons tends to arrange the plate in a slant position, while the action of the plunger 88 on said plate 42 tends to arrange this latter in an horizontal position. In the horizontal position of the plate 42, i. e. when this latter is at right angles to the shaft 11 (Fig. 3), the stroke of the pistons of the hydraulic engine will be null, and therefore the pump will send no fluid to said engine, being its pistons blocked by the oil contained within the cylinders, which oil cannot travel within the cylinders of the engine; due to this blocking of the pistons of the pump, the resting surface of said pistons is caused to rotate by the pistons revoluting with the cylindrical body and therefore also the cap 10 is revoluted, and this latter, being rigid with the cylindrical body of the engine 21; i. e. with the output gear 39, causes said gear 39 to rotate bodily with the body of the cylinders of the pump 7, i. e. with the driving shaft 11. Thus the "top drive" is obtained, and the number of revolutions of the driven shaft equals the number of revolutions of the driving shaft. Vice versa, at the limit position of maximum slant of the surface 42 the difference between the rotary movement of the pump and that of the engine will have the maximum value, which in the described form of embodiment as the ratio 1:3.

The control of said plunger 88 occurs as follows: the operation of the distributor 81 controlled by the driver by means of the lever 77, causes the fluid under pressure to be admitted at the rear portion 90 of the plunger 88, causing the movement of the latter and the consequent movement both of the plate 41 and of the surface 42.

The fluid under pressure existing in the bore 85 (where it arrives through channels extending from the delivery of the pressurising pump, provided into the body of the case 1) is caused to enter the bore 90 by the displacement towards the right portion of Fig. 3 of the distributor 81, as the member 91 of said distributor 81 uncovers the passage 92 allowing the fluid under pressure to enter the chamber 90. The plunger 88 due to the pressure produced by the fluid entering the chamber 90 tends to be rightwards displaced and said displacement will occur until the member 91 registers again with the passage 92 closing said passage. During the leftwards operation of the distributor, the member 91 will uncover again the passage 92 and the fluid will be discharged through the channel 93 into the suction recess 94 of the pump; consequently the plunger 88 will come back leftwards as it is no more held by the pressure of the fluid at 90, due to the thrust of the surface 42. The position of the plunger 88 will be again stabilized when the member 91 will again close the passage 92.

To each position of said member 91, i. e. of the distributor 81, corresponds one determined position of the plunger 88; said position of the plunger is stabilized for a fixed position of the distributor, as the possible underpressures or over-pressures due to external causes within the chamber 90, cause the displacements of the plunger 88 (the movement may also be caused by vibrations, shocks and so on). Consequently, the admission or the discharge of the fluid through the passage 92 occurs, after said passage was displaced in respect to the stationary member 91; said admission or discharge cause the initial position of the plunger 88 to be again established, corresponding to the position of the distributor 81. Thus, by the operation of the lever 77 which is connected to a manual control on the handle-bar, it is possible to pass, continuously, through all of the ratios comprised between 1:1 and 1:3.

In order to having the driving shaft idling in respect to the driven shaft, it is necessary to operate the lever 66 in order to bring back, i. e. to open the valve 67. When said valve 67 is opened, it connects through a passage provided in the eccentric 30, the cylinder bores of the pump with those of the engine, short-circuiting these elements; this way it is possible to render the driven shaft independent from the driving shaft. The valve 67 is held closed by the position of the eccentric 74 of the pivot of the lever 66, and this position of the eccentric 74, i. e. both of the pivot and of the lever is determined by the action of the spring 75.

When the I. C. engine is started by means of the start pedal, the pressurising pump is caused to revolute and also subsequently to a few revolutions due to the operation of the pedal, said pressurising pump allows a pressure to be built up in the circuit, so as to allow an accumulator device 94 for the fluid to be loaded. This accumulator 94, provided with a plunger 95 and a spring 96 allows, when the engine is operating, i. e. when the fluid is under pressure, a portion of said fluid under pressure to be stored into a recess 99, said fluid being kept under pressure with the auxiliary of the spring 96, in order to supply the same fluid to the circuit when the I. C. engine and therefore the pressurising pump are stopped (for instance when the motor is started by the movement of the vehicle, as on a sloping road with the engine stopped). The accumulator device 94 is shown in Fig. 1 with its spring in a non-compressed position.

The engine is started by means of the pedal 65 which revolutes the gear 51, the pinion 50, the shaft 11, the gear 17 and the crank shaft of the I. C. engine. For a correct start, the valve 67 must be in position to open the passage between the inner recess of the distributing ring 30 and the recess outside said ring, i. e. to short-circuit the cylinders of the pump and of the engine; thus when the shaft 11 rotates due to the rotation of the input gear 17 of the coupling, obtained by means of a chain, between the engine crank shaft and said gear 17, the cylindrical body of the engine as well as the output shaft and the output gear rigid therewith, do not rotate and therefore the transmission is idling. The idling position is obtained by a manual action on the lever which by means of the string and through the arm 66 acts on the spring 75 displacing from its seated position the valve 67. When the lever is abandoned, the spring 75 biases the valve 67 which is not suddenly closed due to the action of the fluid flow passing through the seat of said valve 67; therefore the insertion of the transmission will be gradual even if the lever is suddenly abandoned. When the valve 67 is closed, the transmission apparatus is ready to operate (if contemporaneously the engine will be accelerated) as the plate 41 is at its maximum slant, i. e. for a ratio 1:3. By acting then by means of a rotary handle on the traction string operating the lever 77, the distributor 81 is rightwards displaced and said distributor actuates, opening the passage 92, the servomotor comprised of the cylinder 90 and of the plunger 88. The plunger 88 is displaced according to the stroke of the distributor and causes the plate 41 to be moved from the maximum slant position and consequently, as the stroke volume of the hydraulic engine varies, also varied is the ratio of the revolution speed between the hydraulic engine and the pump. As infinite are the intermediate positions of the distributor, correspondingly infinite are the possibilities of slant for the plate and consequently of the transmission ratios between the two limit ratios 1:3 and 1:1.

The operation in contrary direction of the lever 77 causes the plate to be brought again to its maximum slant position, i. e. causes the change from the ratio 1:1 to the ratio 1:3 of the transmission.

In order to disconnect the engine from the wheels, it is sufficient to act on the lever for opening the valve 67.

I claim:

1. A variable speed hydraulic power transmission apparatus for association with an internal combustion motor particularly for use in motorcycles, which comprises an outer case, an input shaft in said case driven by the internal combustion motor, a multicylinder hydraulic pump rotatably mounted in said case, an output shaft in said case, a multicylinder hydraulic motor comprising a cylinder body on said output shaft and in the form of a hollow body having motor cylinders in the wall thereof, motor pistons reciprocatingly mounted in said motor cylinders, a first cap and a second cap closing the ends of said hollow cylinder body, a distributor plate fastened in said hollow cylinder body, said hydraulic pump comprising a cylinder body rotatably mounted in the said hollow motor body and fixed to said input shaft and having a concave spherical surface on one end thereof and a plurality of pump cylinders therein, pump pistons reciprocatingly mounted in said pump cylinders, said distributor plate having suction and delivery ducts therein for pump cylinders and said motor cylinders, ball valve means in the said distributor plate for controlling the passage of the liquid into the section of the hydraulic circuit having a lower pressure, said distributor plate having a convex spherical surface which abuts against the concave spherical surface of said pump body, a projecting hollow portion on said convex spherical surface for rotatably mounting an end of said input shaft, said distributor plate further having a flat surface spaced from the inner surface of said second cap for said hollow cylinder body forming therewith a distribution chamber into which said suction and delivery ducts open, a distributor ring eccentrically mounted in said distribution chamber and abutting against the flat surface of said distributor plate and controlling the passage of the liquid between the cylinders of said pump and said hydraulic motor, said first closing cap having an inner surface inclined to the axis of the input shaft, a ball bearing on the said inclined surface, said pump pistons being slidably abutted against said ball bearing for varying the cubic capacity of the pump cylinders during the rotation of the pump cylinder body, said second closing cap for said hollow cylinder body having a projection thereon which forms said output shaft, a swash plate having two pivots coplanar therewith and positioned diametrically opposite to each other on said plate, and pivoted on the inner surface of said outer case adjacent to said motor cylinder body, the slope of said swash plate being variable, a swash plate ball bearing on said swash plate, the ends of said motor cylinder pistons being slidably abutted against said swash plate ball bearing, said swash plate being provided with a projection on the same side as said pivots, a servo-motor mounted on said outer case and operable from the outside of said outer case for exerting a thrust against said projection on said swash plate, a driving gear mounted on said input shaft adjacent said first closing cap for said hollow cylinder body, an auxiliary gear pump mounted on said input shaft adjacent said driving gear, and an accumulator of liquid pressure in the form of a cylinder fastened to the inner wall of said outer case with the axis parallel to the axis of the input shaft for storing fluid under pressure during the operation of the internal combustion motor and said auxiliary gear pump, and to supply liquid under pressure to said servomotor when the internal combustion motor and said auxiliary gear pump are inoperative, said gear pump connected to the hydraulic circuit of said pump to supply liquid under pressure to the hydraulic circuit of the pump and said hydraulic motor, to said servo-motor, and to said accumulator.

2. A power transmission apparatus as claimed in claim 1 wherein the distributing ring which abuts against the flat surface of the said distributor plate divides said distribution chamber into an inner and an outer portion, one inside and one outside of the said ring, said portions communicating with the cylinders of the pump and the motor, an eccentric disc located inside the distributing ring fastening said distributing ring to said case and provided with an axially bored stem axially contained inside the output shaft, the means for by-passing the cylinders of the pump and the motor being contained within said bored stem, said means comprising a cylindrical valve having an end, a pivot perpendicular thereto provided with an eccentric recess wherein the end of the said valve penetrates, whereby said valve is adapted to move longitudinally inside the said bored stem when said pivot is rotated by means of a device located outside the case.

3. A power transmission apparatus as claimed in claim 1, wherein the auxiliary pump comprises two interengaging gears having different diameters, the gear of lesser diameter being coaxially fastened to the input shaft, a shaft parallel to the driving shaft on which the gear of greater diameter is mounted, a box fastened to the case of the apparatus in which said gears are mounted, the gear of greater diameter being so mounted as to freely rotate on the related shaft when the gear of greater diameter is rotated by the gear of lesser diameter, and means for causing the gear of greater diameter to rotate together with the parallel shaft when the latter is rotated from outside the box.

4. A power transmission apparatus as claimed in claim 1, wherein the the servo-motor comprises a cylinder formed in the wall of the case, a plunger moving in said cylinder, said plunger having a bored stem, a cylindrical guide formed in the inner surface of the case in which said stem slides, said plunger having a cylindrical projection on the side of the plunger opposite to the stem, a first radial duct connecting the bore of the bored stem with the outside of the cylinder through said cylindrical projection, a second radial duct connecting the bore of the bored stem with the inside of the cylinder through the stem of the plunger, a cylindrical rod sliding in the bored stem of the plunger, a cylindrical enlargement on the said rod to open and close the said second radial duct during the moving of the said rod in said bored stem, said rod being operable from the outside of the case.

5. A power transmission apparatus as claimed in claim 1, wherein the accumulator comprises a cylinder formed in the wall of the case and in communication at one side with the auxiliary pump, a plunger contained in said cylinder and guided to move thereinto, a helical spring abutting against the rear face of the plunger and arranged to be compressed by the plunger when the fluid pressure presses the front face of the plunger, whereby fluid under pressure is stored in said cylinder during the operation of the auxiliary pump, said fluid being constantly kept under pressure by said spring and being available to be supplied to the servo-motor which controls the slope of the swash plate when the internal combustion motor and the auxiliary pump are inoperative.

References Cited in the file of this patent

UNITED STATES PATENTS

| | | |
|---|---|---|
| 1,348,738 | Rayburn | Aug. 3, 1920 |
| 1,840,864 | Rayburn et al. | Jan. 12, 1932 |
| 1,840,872 | Rayburn | Jan. 12, 1932 |
| 2,382,027 | Rose | Aug. 14, 1945 |
| 2,382,437 | Molly | Aug. 14, 1945 |